(12) United States Patent
Lee et al.

(10) Patent No.: US 12,658,064 B2
(45) Date of Patent: Jun. 16, 2026

(54) TRAINING SYSTEM AND METHOD FOR SOUND DIRECTIONAL DISCRIMINATION ABILITY

(71) Applicant: Industry Academic Cooperation Foundation, Hallym University, Chuncheon-Si (KR)

(72) Inventors: Hyo Jeong Lee, Chuncheon-Si (KR); Ja Hee Kim, Chuncheon-Si (KR); Lee Seul Shim, Chuncheon-Si (KR)

(73) Assignee: Industry Academic Cooperation Foundation, Hallym University, Chuncheon-Si (KR)

( * ) Notice: Subject to any disclaimer, the term of this patent is extended or adjusted under 35 U.S.C. 154(b) by 481 days.

(21) Appl. No.: 18/250,336

(22) PCT Filed: Oct. 19, 2021

(86) PCT No.: PCT/KR2021/014525
§ 371 (c)(1),
(2) Date: Apr. 24, 2023

(87) PCT Pub. No.: WO2022/092663
PCT Pub. Date: May 5, 2022

(65) Prior Publication Data
US 2023/0401968 A1 Dec. 14, 2023

(30) Foreign Application Priority Data
Oct. 29, 2020 (KR) ........................ 10-2020-0142250

(51) Int. Cl.
*G09B 5/04* (2006.01)
*G09B 5/06* (2006.01)
(Continued)

(52) U.S. Cl.
CPC ................. *G09B 5/04* (2013.01); *G09B 5/06* (2013.01); *G09B 23/30* (2013.01); *H04R 1/32* (2013.01)

(58) Field of Classification Search
CPC ....................................................... G09B 5/04
See application file for complete search history.

(56) References Cited

U.S. PATENT DOCUMENTS

| | | | | | |
|---|---|---|---|---|---|
| 5,825,894 A | * | 10/1998 | Shennib | ................. | H04R 25/70 381/60 |
| 2014/0198918 A1 | | 7/2014 | Li et al. | | |
| 2018/0234776 A1 | * | 8/2018 | Fung | ....................... | H04S 1/005 |

FOREIGN PATENT DOCUMENTS

| | | |
|---|---|---|
| CN | 108616789 A | 10/2018 |
| JP | 2007282820 A | 11/2007 |

(Continued)

OTHER PUBLICATIONS

International Search Report issued in International Application No. PCT/KR2021/014525, mailed on Feb. 3, 2022 (5 pages).

(Continued)

*Primary Examiner* — Thomas J Hong
(74) *Attorney, Agent, or Firm* — Osha Bergman Watanabe & Burton LLP

(57) ABSTRACT

A training system for sound directional discrimination ability includes: a speaker that is located in an angle range determined left or right in front of a human dummy or disposed in front of a subject and generates a sound directional training sound multiple times; a microphone which is worn on each of both ears of a human dummy or the subject and obtains the training sound; a training sound reproduction unit for reproducing at least a part of the obtained training sound for each of the configuration angles; a response information determination unit for providing the subject with multiple visual targets for each of the configuration (Continued)

angles and determining whether the subject has selected a correct response visual target among the multiple visual targets; and a level control unit for selecting at least one angle among the configuration angles.

8 Claims, 10 Drawing Sheets

(51) Int. Cl.
G09B 23/30 (2006.01)
H04R 1/32 (2006.01)

(56) References Cited

FOREIGN PATENT DOCUMENTS

| | | | |
|---|---|---|---|
| JP | 2013110633 | A | 6/2013 |
| KR | 20060022968 | A | 3/2006 |
| KR | 100606734 | B1 | 8/2006 |
| KR | 20140034817 | A | 3/2014 |
| KR | 20190086868 | A | 7/2019 |

OTHER PUBLICATIONS

Written Opinion issued in International Application No. PCT/KR2021/014525, mailed on Feb. 3, 2022 (4 pages).
Office Action issued in corresponding Chinese Application No. 202180073275.6, dated Aug. 14, 2025 (18 pages).
Yun-Han Wu et al., "Analysis and training of human sound localization behavior with VR application" AES Conference on Immersive and Interactive Audio, Mar. 27, 2019 (8 pages).

* cited by examiner

FIG 3
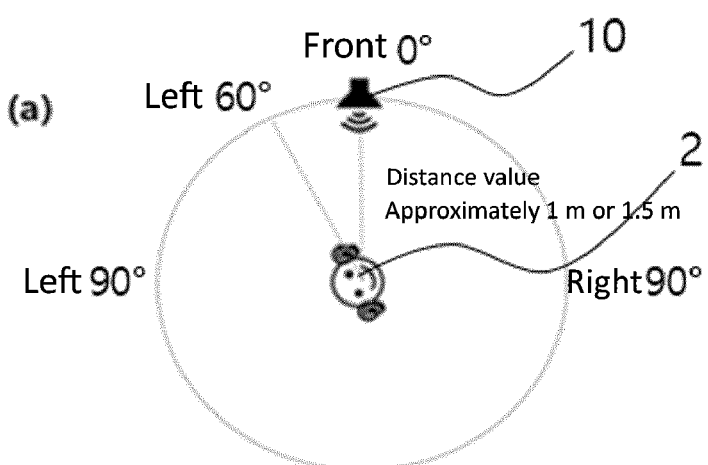
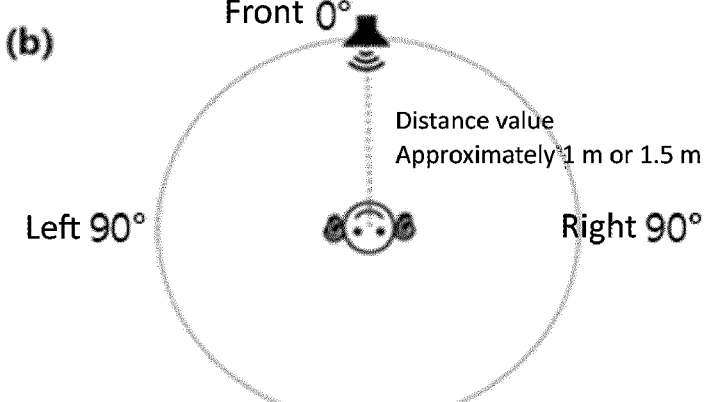
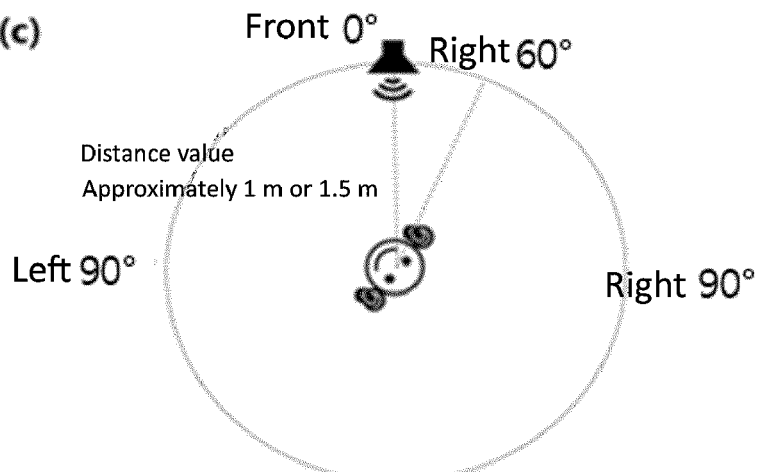

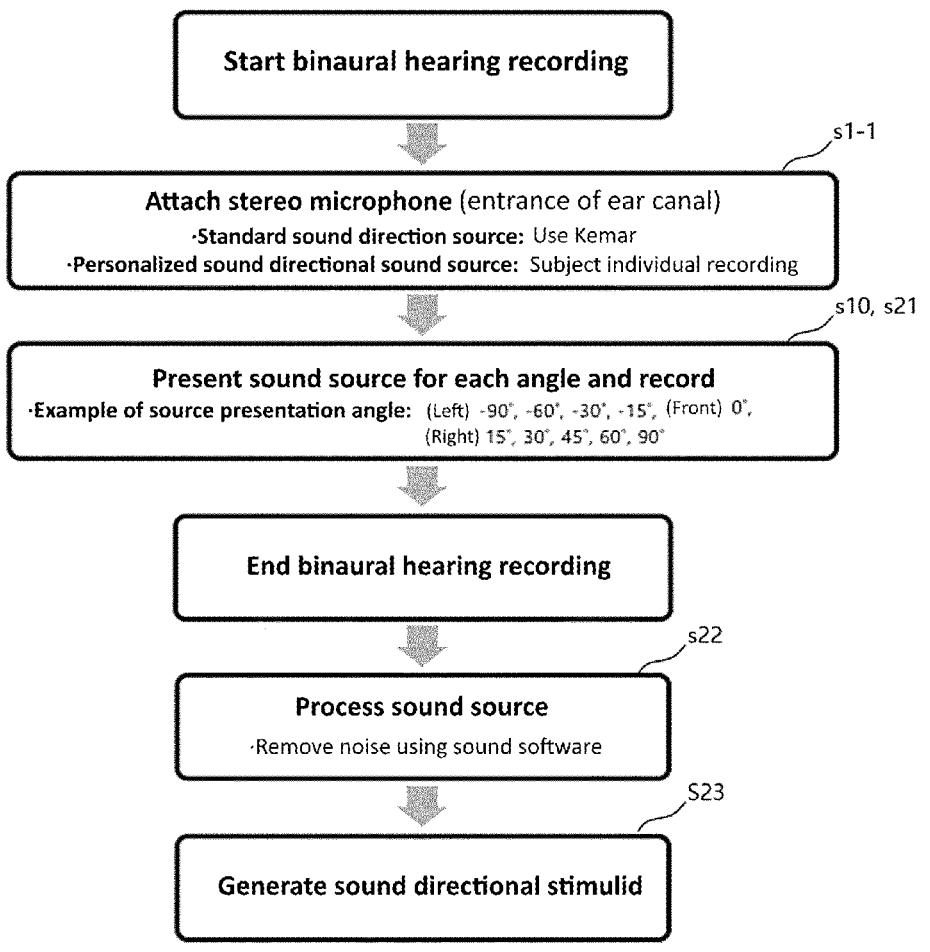

Start binaural hearing recording s1-1

Attach stereo microphone (entrance of ear canal)
·Standard sound direction source: Use Kemar
·Personalized sound directional sound source: Subject individual recording s10, s21

Present sound source for each angle and record
·Example of source presentation angle: (Left) -90°, -60°, -30°, -15°, (Front) 0°,
(Right) 15°, 30°, 45°, 60°, 90°

End binaural hearing recording s22

Process sound source
·Remove noise using sound software

S23

Generate sound directional stimulid

FIG 10

| Stimulation direction | -60° | -45° | -30° | -15° | 0° | 15° | 30° | 45° | 60° |
|---|---|---|---|---|---|---|---|---|---|
| Level 1 | ◁)) | | | | ◁)) | | | | ◁)) |
| Level 2 | ◁)) | | ◁)) | | ◁)) | | ◁)) | | ◁)) |
| Level 3 | ◁)) | | ◁)) | ◁)) | ◁)) | ◁)) | ◁)) | | ◁)) |
| Level 4 | ◁)) | ◁)) | ◁)) | ◁)) | ◁)) | ◁)) | ◁)) | ◁)) | ◁)) |

TRAINING SYSTEM AND METHOD FOR SOUND DIRECTIONAL DISCRIMINATION ABILITY

TECHNICAL FIELD

The present invention relates to a system and a method for training a sound directional discrimination ability for auditory rehabilitation, which train individual sound directional discrimination abilities by using a virtual reality or augmented reality.

BACKGROUND ART

The limitations of conventional auditory rehabilitation can be divided into the following: lack of training methods, spatial limitations, and absence of training methods for asymmetric hearing loss.

Regarding the lack of training methods, sound directional discrimination ability training tools have not yet been developed in Korea, and in order to verify the effects of training using auditory stimuli (Firszt et al., 2015) and training using audio-visual integration functions (Strelnikov et al., 2011; Isaiah et al., 2014) overseas, studies comparing and observing normal people and cochlear implant rehabilitation users have been published, but the number is insignificant.

Regarding the spatial limitations, until now, auditory rehabilitation for hearing-impaired patients has been centered on visiting training, and app-based portable training tools are not widely used, and this is because it is essential to provide directional information within sound directional training, so due to the limitations of using a large soundproof space in which sound sources in various directions exist, it is difficult to develop inspection and training methods.

Regarding the absence of a training method for asymmetric hearing loss, in the case of asymmetric hearing loss particularly with a low sound directional discrimination ability, it is necessary to use a personalized stimuli sound because different information is required from the sound directionality information used when hearing on both sides is normal. When hearing on both sides is symmetrical like normal hearing, the sound directionality information is determined by the time difference between the arrival of the sound source to both ears and the difference in intensity of the sound arriving at both ears.

However, when the hearing on both sides is asymmetric, the interaural time/intensity difference information is distorted, so the third sound directionality information, the spectral cue, is a decisive factor. Spectrum information is a feature of sound reflected by the auricle, ear canal, upper body, and head, and since a person's body is different for each individual, the spectrum information is inevitably different for each individual. In the case of the asymmetric hearing loss, sound direction training can be performed only when a sound source from which different spectral information is extracted for each individual is used.

There are a total of 3 clues for humans to judge sound directionality, including 2 clues caused by using both ears (binaural effect) and 1 clue obtained through one ear.

The clue obtained by using both ears consists of the interaural time difference (IDT): Interaural Time Difference) at which the sound source reaches the binaural and the intensity difference (ILD: Interaural Level Difference) at which the sound source reaches the binaural, and in the case of a normal hearing person, the sound directionality in the horizontal direction is discriminated using these two pieces of information.

On the other hand, there are auditory clues that can be used to discriminate the sound direction for each individual even through one ear alone, rather than comparing the sound perceived by both ears, and this is a spectral clue to which the frequencies of the sound sources are filtered according to shapes of different ears, and shapes of the head and the upper body for each individual.

Unlike people with normal hearing, patients with asymmetric hearing loss cannot use cues using both ears for a sound directional discrimination ability, so only spectral cues modulated on one side are used. Spectral cues are generated when acoustic information is filtered by an individual's anatomical features of the head, torso, and auricle, so each individual's spectral cues are different for each individual.

Therefore, in the case of a patient with asymmetric hearing loss, if the same standardized stimulus sound is used as in normal people, individual differences cannot be reflected, so the sound directionality information cannot be provided.

DISCLOSURE

Technical Problem

The present invention is directed to providing a system and a method for training a sound directional discrimination ability which enable personalized training through processing of individually recorded sound sources and enhance the sound directional discrimination ability of determining a location of a sound.

Technical Solution

In order to achieve such an object, a first aspect of the present invention provides a system for training a sound directional discrimination ability. The system may include: a speaker disposed to be located within an angle range determined left and right in front of a human dummy, or disposed in front of a rotating subject and generates a sound directional training sound multiple times; a microphone worn on each of both ears of the human dummy or the subject, and acquiring multiple training sounds received from the speaker, in which the microphone acquires the training sound multiple times between the human dummy and the speaker or between one ear of the rotating subject and the speaker for each of multiple configuration angles; a training sound reproduction unit reproducing at least some of the acquired training sounds for each set angle with respect to the subject; a response information determination unit providing the subject with multiple visual targets for each set angle, and determining whether the subject selects a correct response visual target corresponding to the set angle of the reproduced training sound among the multiple visual targets; and a level control unit selecting at least one angle among the set angles of the training sound to be reproduced to the subject.

According to the exemplary embodiment of the present invention, the level control unit may control a level according to the number of times the subject selects the correct response visual target and control the number of set angles of the training sound reproduced to the subject to be further increased as the level is higher.

According to the exemplary embodiment of the present invention, the training sound reproduction unit reproduces the training sound corresponding to the angle set by the level control unit to the subject multiple times to allow the subject to check a reproduction direction of the training sound in advance.

According to the exemplary embodiment of the present invention, the system may further include a visual response providing unit providing a visual stimulus to the subject when the subject selects the correct response visual target.

According to the exemplary embodiment of the present invention, the training sound reproduction unit may reproduce multiple training sounds having signal to noise ratios of different sizes for each set angle of the training sound reproduced to the subject exposed to a surrounding environment at each level.

According to the exemplary embodiment of the present invention, the level control unit may increase the level to an n+1-th level when a frequency of selecting the correct response visual target by the subject at an n-th level is equal to or greater than a predetermined probability.

A second aspect of the present invention provides a method for training a sound directional discrimination ability, which is performed by a system for training a sound directional discrimination ability including a speaker, a microphone, a training sound reproduction unit, a response information determination unit, and a level control unit. The method may include: (a) a step in which a speaker is disposed to be located within an angle range left or right in front of a human dummy, or disposed in front of a rotating subject and generates a sound directional training sound multiple times; (b) a step in which the microphone is worn on each of both ears of the human dummy or the subject, and acquires multiple training sounds received from the speaker, in which the microphone acquires the training sound multiple times between the human dummy and the speaker or between one ear of the rotating subject and the speaker for each of multiple set angles; (c) a step in which the training sound reproduction unit reproduces at least some of the acquired training sounds for each set angle with respect to the subject; (d) a step in which the response information determination unit provides the subject with multiple visual targets for each set angle, and determines whether the subject selects a correct response visual target corresponding to the set angle of the reproduced training sound among the multiple visual targets; (e) a step in which the level control unit selects at least one angle among the set angles of the training sound to be reproduced to the subject; (f) a step in which the training sound reproduction unit reproduces at least one training sound according to the angle set by the level control unit to the subject; and (g) a step of repeating steps (d) to (f) above.

According to the exemplary embodiment of the present invention, in step (e) above, the level control unit may control a level according to the number of times the subject selects the correct response visual target and control the number of set angles of the training sound reproduced to the subject to be further increased as the level is higher.

According to the exemplary embodiment of the present invention, in step (c) above, the training sound reproduction unit reproduces the training sound corresponding to the angle set by the level control unit to the subject multiple times to allow the subject to check a reproduction direction of the training sound in advance.

According to the exemplary embodiment of the present invention, the sound directional discrimination ability training system may further include a visual response providing unit, and the method may further include a step in which the visual response providing unit provides the subject with a visual stimulus when the subject selects the correct response visual target, between step (d) above and step (e) above.

According to the exemplary embodiment of the present invention, in step (f) above, the training sound reproduction unit may reproduce multiple training sounds having signal to noise ratios of different sizes for each set angle of the training sound reproduced to the subject exposed to a surrounding environment at each level.

According to the exemplary embodiment of the present invention, in step (e) above, the level control unit may increase the level to an n+1-th level when a frequency of selecting the correct response visual target by the subject at an n-th level is equal to or greater than a predetermined probability.

Advantageous Effects

In the portable individualized sound directional discrimination ability training method adopting a virtual reality and an augmented reality according to the present invention, since a recorded sound is presented by a headphone by deviating from the method of testing and training through multiple speakers in a sound field, which is a method previously used in clinical practice, it is possible to easily evaluate and train the sound directional discrimination ability, free from spatial limitations.

Further, if necessary, by using the personalized sound directional information acquired through binaural recording for each individual, it is possible to perform training free from the spatial limitations.

In addition, in everyday life, a subject can perform sound discrimination ability training by himself.

DESCRIPTION OF DRAWINGS

FIGS. 3A to 3C are plan views illustrating an example of personalized sound directional training sound recording according to a second exemplary embodiment of the present invention.

FIG. 8 is a flowchart illustrating a training sound generation step and a training sound acquisition step among respective steps of FIG. 7.

FIG. 10 is a table illustrating an example of a level-wise sound source direction presenting angle of sound discrimination ability training using a VR/AR device according to the present invention.

BEST MODE

Hereinafter, a preferred embodiment of the present invention will be described in detail with reference to the accompanying drawings. Moreover, in the following description, a detailed explanation of related known configurations or functions may be omitted to avoid obscuring the subject matter of the present invention.

Figure 1:
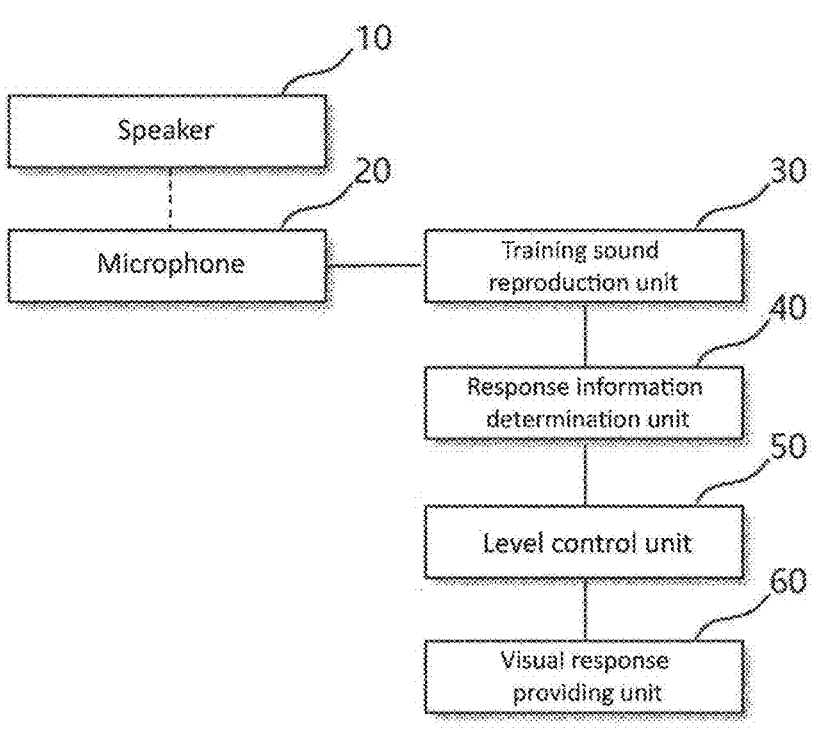
FIG. 1 is a configuration diagram illustrating each component of a system for training a sound directional discrimination ability according to the present invention.

FIG. 1 is a configuration diagram illustrating each component of a system for training a sound directional discrimination ability according to the present invention.

Referring to FIG. 1, the sound directional discrimination ability training system according to the present invention includes a speaker 10, a microphone 20, a training sound reproduction unit 30, a response information determination unit 40, a level control unit 50, and a visual response providing unit 60.

The speaker 10 is disposed to be located within an angle range determined left and right in front of a human dummy 1 or disposed in front of a rotating subject 2 and generates a sound directional training sound multiple times.

For example, multiple speakers 10 may be disposed within a determined angle range at the left and right sides in front of the human dummy 1, or the human dummy 1 may be designed to rotate in a determined angle range at the left and right sides with respect to one speaker 10. Alternatively, the subject 2 may be designated to rotate with one speaker 10 disposed in front.

An example of the human dummy 1 is GRAS' KEMAR (Knowles Electronics Manikin for Acoustic Research), B &K's HATS (Head and Torso Simulator), or the like. For example, Kemar-45BA (GRAS Sound and Vibration) may be used.

The microphone 20 is worn on each of both ears of the human dummy 1 or the subject 2 and acquires multiple training sounds received from the speaker 10. The microphone 20 acquires the training sound multiple times between the human dummy 1 and the speaker 10 or between one ear of the subject 2 and the speaker 10 for each of multiple set angles. As an example of the microphone 20, a binaural recording microphone (Sound professionals SP-TFB-2) may be used. The microphone 20 is connected to a device such as a general PC, stores recorded training sound data, and transmits the stored training sound data to the training sound reproducing unit 30.

The training sound reproduction unit 30 may reproduce at least some of the acquired training sounds for each set angle with respect to the subject 2. The training sound reproduction unit 30 may receive the training sound data from the microphone 20 and use the received training sound data to reproduce at least one training sound to the subject 2 through, for example, an earphone connected to a PC.

The response information determination unit 40 may provide the subject 2 with multiple visual targets 3 (see FIG.

6) for each set angle and determine whether the subject 2 selects a correct response visual target corresponding to the set angle of the reproduced training sound among the multiple visual targets. In detail, for example, multiple visual targets are displayed to the subject 2 through VR (or AR) equipment connected to the PC, and the subject 2 listens to the training sound reproduced by the training sound reproduction unit 30 and determines where a direction of the training sound is and selects the visual target 3 corresponding thereto. The response information determination unit 40 may determine whether the visual target 3 selected by the subject 2 is the correct response visual target.

The level control unit 50 may select at least one angle among the set angles of the training sound to be reproduced to the subject 2.

The visual response providing unit 60 may provide a visual stimulus to the subject 2 when the subject 2 selects the correct response visual target.

Meanwhile, detailed configurations of the level control unit 50 and the visual response providing unit 60 will be described later.

Figure 2:
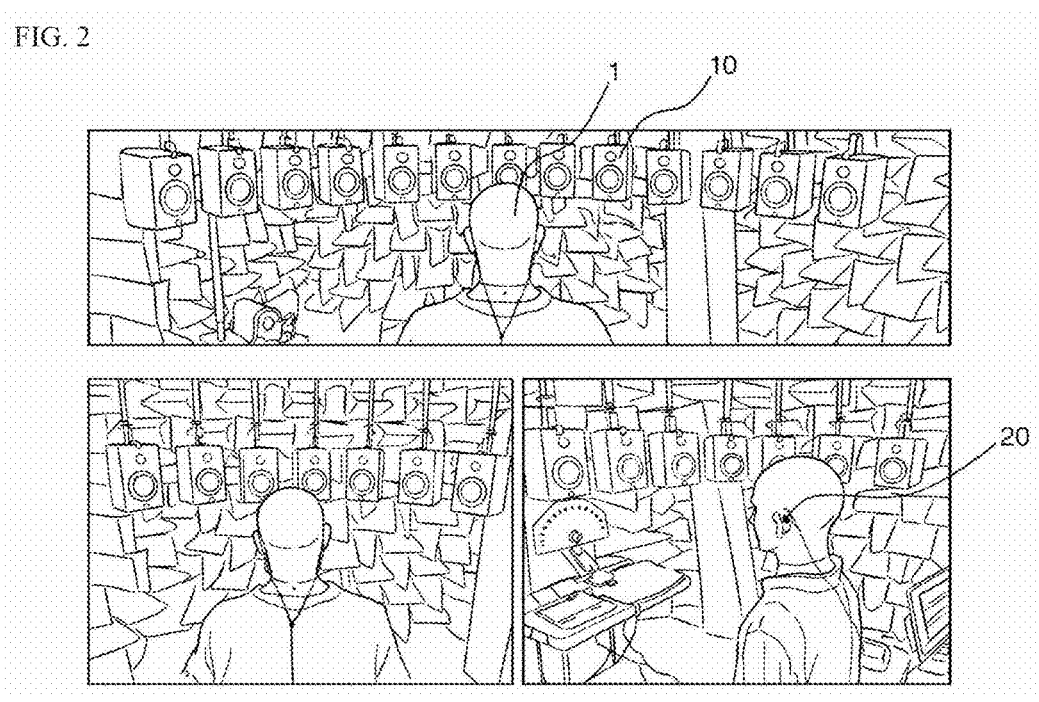
FIG. 2 is a diagram illustrating an example of sound directional training sound recording using a human dummy according to a first exemplary embodiment of the present invention.
Figure 4:
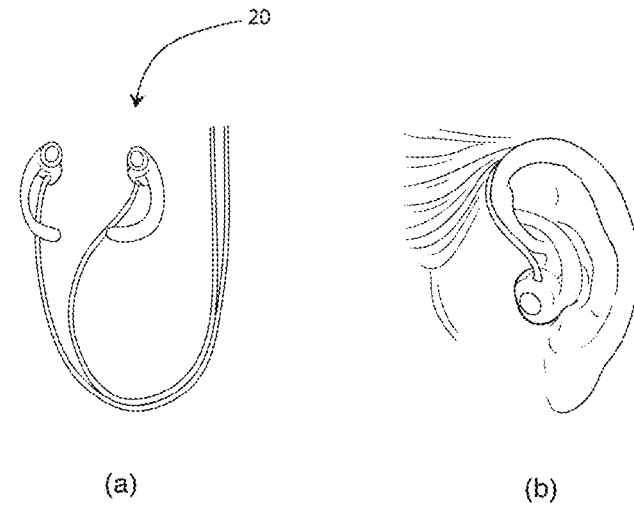
FIGS. 4A and 4B are diagrams illustrating a stereo microphone for binaural recording and a state in which the stereo microphone is worn on a concha.

FIG. 2 is a diagram illustrating an example of sound directional training sound recording using a human dummy according to a first exemplary embodiment of the present invention. FIGS. 3A to 3B are plan views illustrating an example of personalized sound directional training sound recording according to a second exemplary embodiment of the present invention. FIGS. 4A and 4B are diagrams illustrating a stereo microphone for binaural recording and a state in which the stereo microphone is worn on a concha.

In the present invention, the production of sound sources through standardized devices and the production of sound sources through recording of each person's binaural hearing are performed, and two exemplary embodiments of the binaural hearing recording method according to the present invention are as follows.

The configuration for recording a standard sound directional stimulus sound according to the first exemplary embodiment of the present invention is described as follows.

Referring to FIG. 2, the microphones are attached to both ears of the human dummy 1 having an average human ear shape using the human dummy 1 (e.g., Kemar-45BA (GRAS Sound and Vibration) illustrated in FIG. 1) to record training sounds.

The speaker 10 may be combined and disposed at angles of (left) −90°, −45°, −30°, and −15°, (front) 0°, (right) 15°, 30°, 45°, 60°, and 90°, or in various other directions with respect to the human dummy 1. Two microphones 20 (for example, Sound professionals SP-TFB-2 illustrated in FIG. 3) are fixed to both ear canal entrances of the human dummy 1, respectively, and sound sources for various directions in which the speakers 10 are disposed are recorded.

Alternatively, in order to control a variable between speakers, recording may be performed while moving the human dummy 1 according to the angle of the speaker and sequentially changing the direction. Accordingly, it is possible to acquire all stimulation sounds in various directions with a single speaker.

The configuration for recording a personalized sound directional stimulus sound according to the second exemplary embodiment of the present invention is described as follows.

With reference to FIG. 3, the exemplary embodiment for recording and acquiring individual sound directional training sounds optimized for individual training subjects will be described as follows.

Two microphones 20 (for example, Sound professionals SP-TFB-2 illustrated in FIG. 4) are fixed to both ear canal entrances of the subject, respectively, and for example, training sounds for 11 directions are recorded. Recording is performed while the subject 2 rotates and changes direction using only one speaker 10 to control inter-speaker variables.

FIG. 4A illustrates a binaural microphone (Sound professionals SP-TFB-2) used for binaural heating recording as an example of the microphone 20 used in the present invention, and FIG. 4B is a diagram illustrating a state in which when the binaural microphone is worn a concha, the binaural microphone is fixed according to the shape of the ear of the subject. Through this, it is possible to more accurately record training sounds presented from sound sources in various directions.

Figure 5:
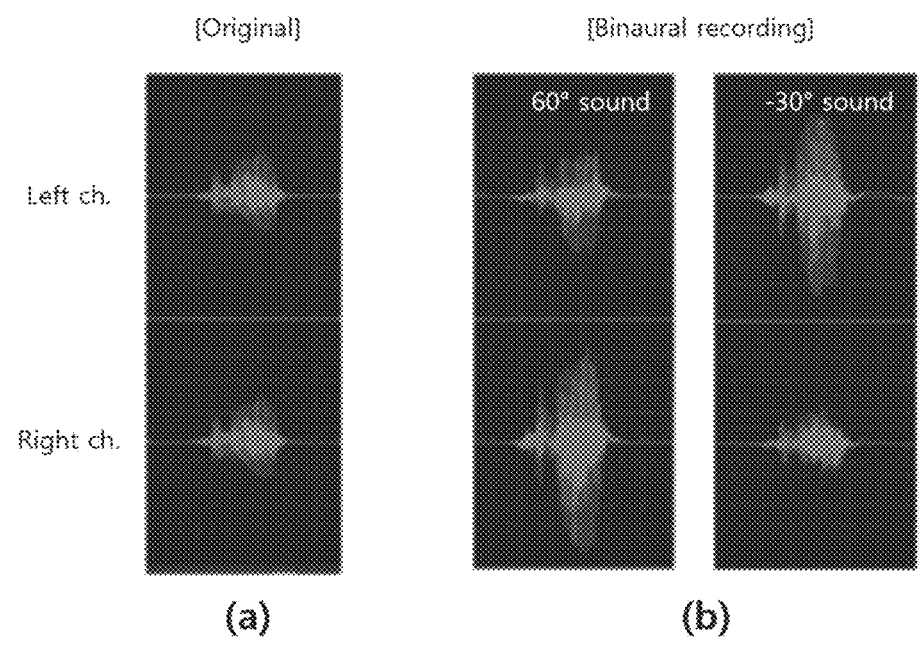
FIGS. 5A and 5B are diagrams illustrating a result of experimentally observing whether the binaural recording is accurately capable of reproducing a directional sound source according to the exemplary embodiments of the present invention.

FIGS. 5A and 5B are diagrams illustrating a result of experimentally observing whether the binaural hearing recording is accurately capable of reproducing a directional sound source according to exemplary embodiments of the present invention. FIG. 5A illustrates an original sound wave file, and FIG. 5B illustrates a wave file of an auditory stimulus recorded in both ears according to an angle.

When a waveform actually recorded by the microphone 20 according to the angle of the speaker 10 is described as illustrated in FIG. 5B, it may be seen that since the sound through the speaker 10 located at 60° with respect to the human dummy 1 or the subject 2 first reaches a right ear, the intensity of a right channel is recorded to be large, and the sound through the speaker 10 located at −30° first reaches a left ear, so the intensity of a left channel is recorded to be large. Through this, it is possible to check an intensity difference and a time difference visible to the naked eye in two channels on the left and right, and it may be seen that the configuration of the present invention is suitable for designing a directional sound source to be used for auditory rehabilitation training.

Accordingly, in this performance training, the training sound directly recorded from the sound source reaching the individual ear may be used for VR/AR training, and this method is particularly effective for patients with an asymmetric hearing loss patient.

Figure 6:
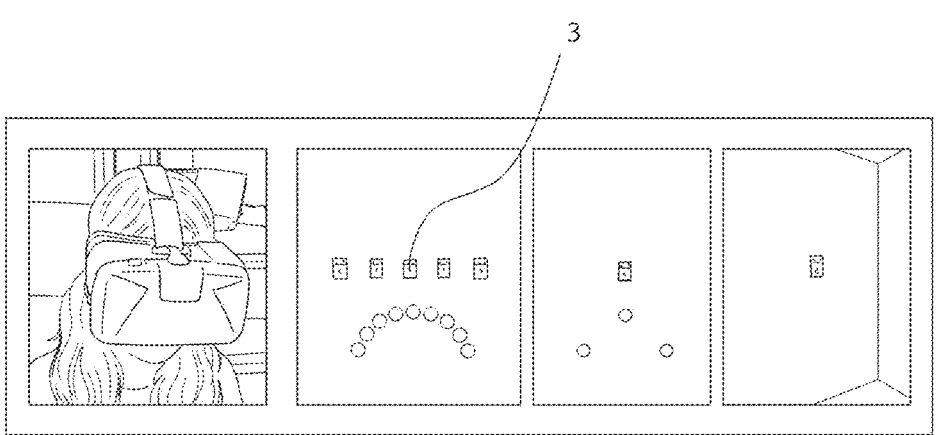
FIG. 6 is a diagram illustrating a VR device wearing state and a VR training program according to the exemplary embodiment of the present invention.

FIG. 6 is a diagram illustrating a VR device wearing state and a VR training program according to the exemplary embodiment of the present invention.

With reference to FIG. 6, the design of a portable training tool using a VR (or AR) device for applying the present invention is described in detail as follows.

A design configuration of the portable training tool using the VR (or AR) device according to the exemplary embodiment of the present invention is described as follows.

As a device used for designing a portable training tool, a PC, a PC monitor, a VR device (e.g., VIVE pro (HTC)) or AR device, and earphones may be used.

A sound directional discrimination ability rehabilitation training tool using the VR (AR) device which is a portable training tool using audio-visual complex stimulation is designed, which may overcome spatial limitations outside a limited booth for all hearing loss patients, including persons with normal hearing and patients with unilateral hearing loss.

As an auditory training program used in this training, a unity (Unity tech, 2019) program may be used, and driven through Steam (Valve cooperation, 2013) software. As a virtual reality device used in training, VIVE pro eye tracking (HTC) may be used. However, the VR and AR devices may be used regardless of a model.

In addition, as a stimulation sound source used in this training, in the case of the person with normal hearing, a binaural sound source using the human dummy 1 identical to that recorded in a standardized adult's ear may be used, and in the case of the patients with asymmetric hearing loss, the training sound produced through the individual binaural hearing recording of the subject 2 may be used.

Figure 7:
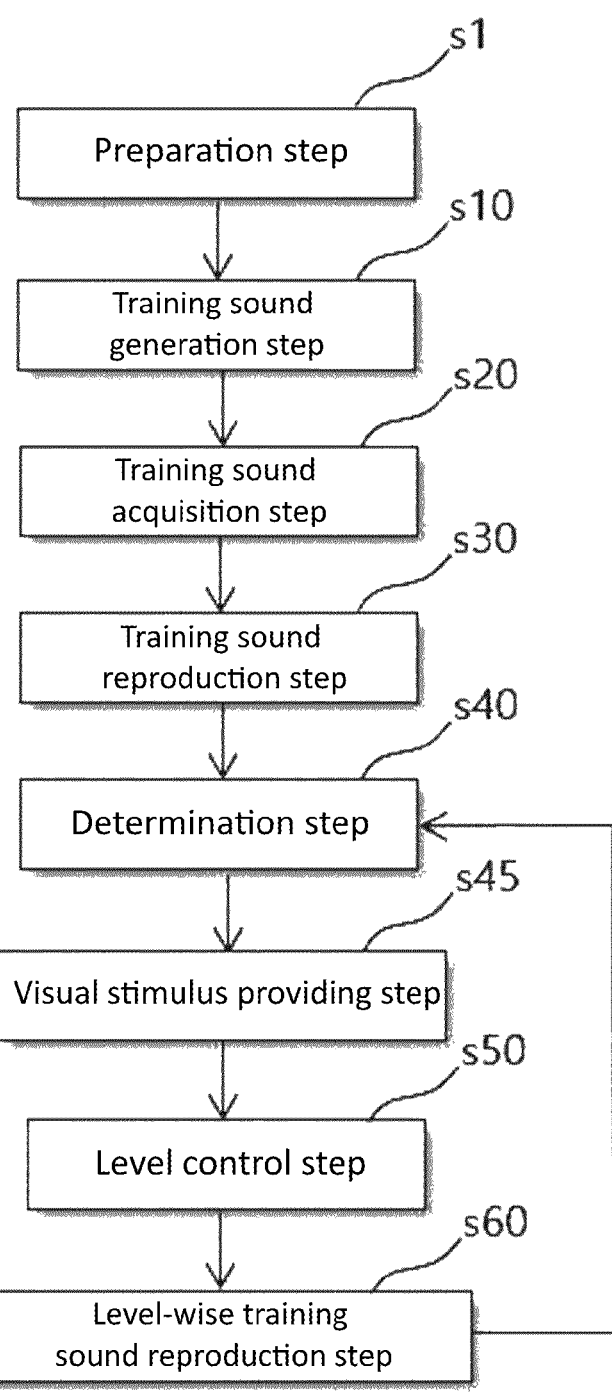
FIG. 7 is a flowchart illustrating each step of a method for training a sound directional discrimination ability according to the present invention.
Figure 9:
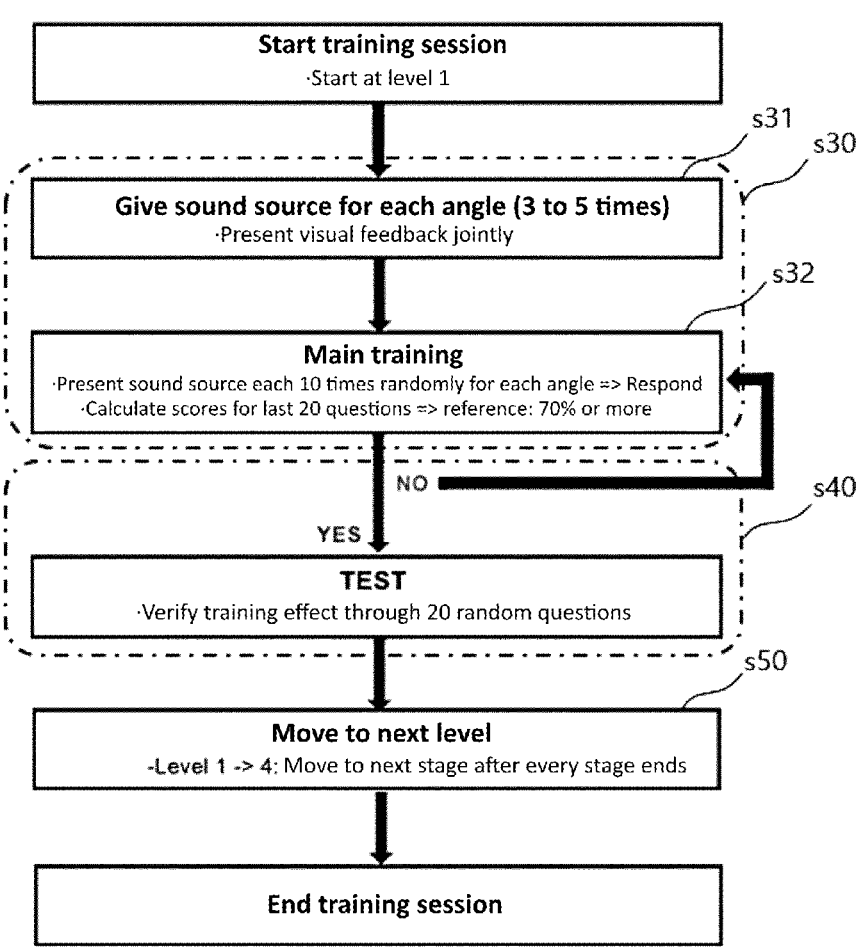
FIG. 9 is a flowchart illustrating a training sound reproduction step, a determination step, a level control step, and a level-wise training sound reproduction step among the respective steps of FIG. 7.

FIG. 7 is a flowchart illustrating each step of a method for training a sound directional discrimination ability according to the present invention. FIG. 8 is a flowchart illustrating a training sound generation step and a training sound acquisition step among respective steps of FIG. 7. FIG. 9 is a flowchart illustrating a training sound reproduction step, a determination step, a level control step, and a level-wise training sound reproduction step among the respective steps of FIG. 7.

Referring to FIG. 7, the method for training a sound directional discrimination ability according to the present invention includes a preparation step s1, a training sound generation step s10, a training sound acquisition step s20, a training sound reproduction step s30, a determination step s40, a level control step s50, and a level-wise training sound reproduction step s60.

Referring to FIG. 8, the preparation step s1 includes a step s1-1 of mounting the microphone 20 to the entrance of the ear canal of the human dummy 1 or the subject 2. The Kemar human dummy 1 may be used to obtain the standard sound directional training sound, and recording may be performed individually for each subject 2 to obtain the personalized sound directional training sound.

The training sound generation step s10 is a step in which the speaker 10 is disposed to be located within an angle range determined left and right in front of the human dummy 1 or disposed in front of a rotating subject 2 and generates the sound directional training sound multiple times. The speaker 10 may generate the training sound at angles of (left) −90°, −45°, −30°, and −15°, (front) 0°, (right) 15°, 30°, 45°, 60°, and 90°, or in various other directions with respect to the human dummy 1 or the subject 2.

The training sound acquisition step s20 is a step in which the microphone 20 is worn on each of both ears of the human dummy 1 or the subject 2 and acquires multiple training sounds received from the speaker 10. The microphone 20 records the sound directional training sound generated by the speaker 10 (s21). The recorded training sound goes through a sound source processing process (s22) through known sound software and is generated as a final sound directional training sound (s23).

Referring to FIG. 9, the sound directional discrimination ability training method according to the present invention allows the subject 2 to perform training for each level according to the training level, and the training starts at level 1 first. Among the training sounds acquired for each level, which angle of training sounds is reproduced and the number of training sounds to be reproduced are determined in advance. The level control unit 50 may configure the initial training to start from level 1, and adjust the level applied to each training according to a training progress situation.

The training sound reproduction step s30 is a step in which the training sound reproduction unit 30 reproduces at least some of the acquired training sounds for each of the set angles for the subject. The training sound reproduction step s30 includes a training sound pre-reproduction step s31 and a training sound main reproduction step s32.

In the training sound pre-reproduction step s31, the training sound reproduction unit 30 reproduces the training sound corresponding to at least one angle set by the level control unit 50 to the subject 2 multiple times and allows the subject 2 to check a reproduction direction of the training sound in advance.

In detail, the training sound reproduction unit 30 presents a sound source for each angle before training so as to get used to the sound direction in a VR/AR environment. For example, before the start of a sound discrimination ability training session, the training sound reproduction unit 30 allows the subject 2 to hear the sound from the angle corresponding to each step 3 to 5 times, respectively, to check the target sound direction, and at the same time, the visual response providing unit 60 visually provide feedback.

In the training sound main reproduction step s32, when main training (actual training) is performed through the VR/AR device, the training sound reproduction unit 30 randomly reproduces the number of training sounds determined for each angle to the subject 2.

The determination step s40 is a step in which the response information determination unit 40 provides the subject with multiple visual targets for each set angle and determines whether the subject selects a correct response visual target corresponding to the set angle of the reproduced training sound among the multiple visual targets.

In the determination step s40, when the subject 2 responds to the visual target recognized as sound for each training sound, the response information determination unit 40 checks a response of the subject 2 through a VR controller (not illustrated).

Next, a visual stimulus providing step s45 is performed. The visual stimulus providing step s45 is a step in which the visual response providing unit 60 provides a visual stimulus to the subject 2 when the subject 2 selects the correct response visual target. The visual response providing unit 60 provides whether the subject 2 himself/herself has a correct response by the visual stimulation through the display of the VR/AR device, and for example, colors of the visual targets in a case of showing the correct response and in a case of showing an error response may be different.

FIG. 10 is a table illustrating an example of a level-wise sound source direction presenting angle of sound discrimination ability training using a VR/AR device according to the present invention.

Referring to FIG. 10, the level control step s50 is a step in which the level control unit 50 selects at least one angle among the set angles of the training sound to be reproduced to the subject. The level control unit 50 may control the level according to the number of times the subject 2 selects a correct response visual target and control the number of set angles of the training sound reproduced to the subject 2 to be increased as the level is higher.

The level control unit 50 may increase the level to the n+1-th level when a frequency of selecting the correct response visual target by the subject at the n-th level is equal to or greater than a predetermined probability.

In detail, sound discrimination ability training using the VR/AR device may be performed in several stages with different levels of difficulty. The level control step s50 consists of, for example, a total of four levels, starting with the easiest level 1 and proceeding to the next level. Proceeding to the next level moves to the next level of training when the correct response reaches a certain target level (for example, 70%) through performance evaluation after training at the previous level. On the other hand, if a performance evaluation result does not reach the target level, the training of the corresponding level is repeatedly performed.

The level-wise training sound reproduction step s60 is a step in which the training sound reproduction unit 30 reproduces at least one training sound according to the angle set by the level control unit 50 to the subject. In the level-wise training sound reproduction step s60, the training sound according to the level controlled in the level control step s50 is reproduced. As described above, among the training sounds acquired for each level, which angle of the training sound is reproduced and the number of training sounds to be reproduced are determined in advance, and the training sound determined for each level is reproduced to the subject 2.

Next, the determination step s40, the visual stimulus providing step s45, the level control step 50, and the level-wise training sound reproduction step s60 are repeatedly performed a predetermined number of times.

The sound discrimination ability training using the VR/AR device may be composed of various periods, cycles, and numbers of times. For example, 3 times a week, a total of 9 times for 3 weeks, training per session may be configured and performed for about 30 minutes to 1 hour. The training time and frequency may be controlled according to the participant's performance level change. A result of auditory training for each session is stored as a log file in a database to monitor a progress situation.

Figure 11:
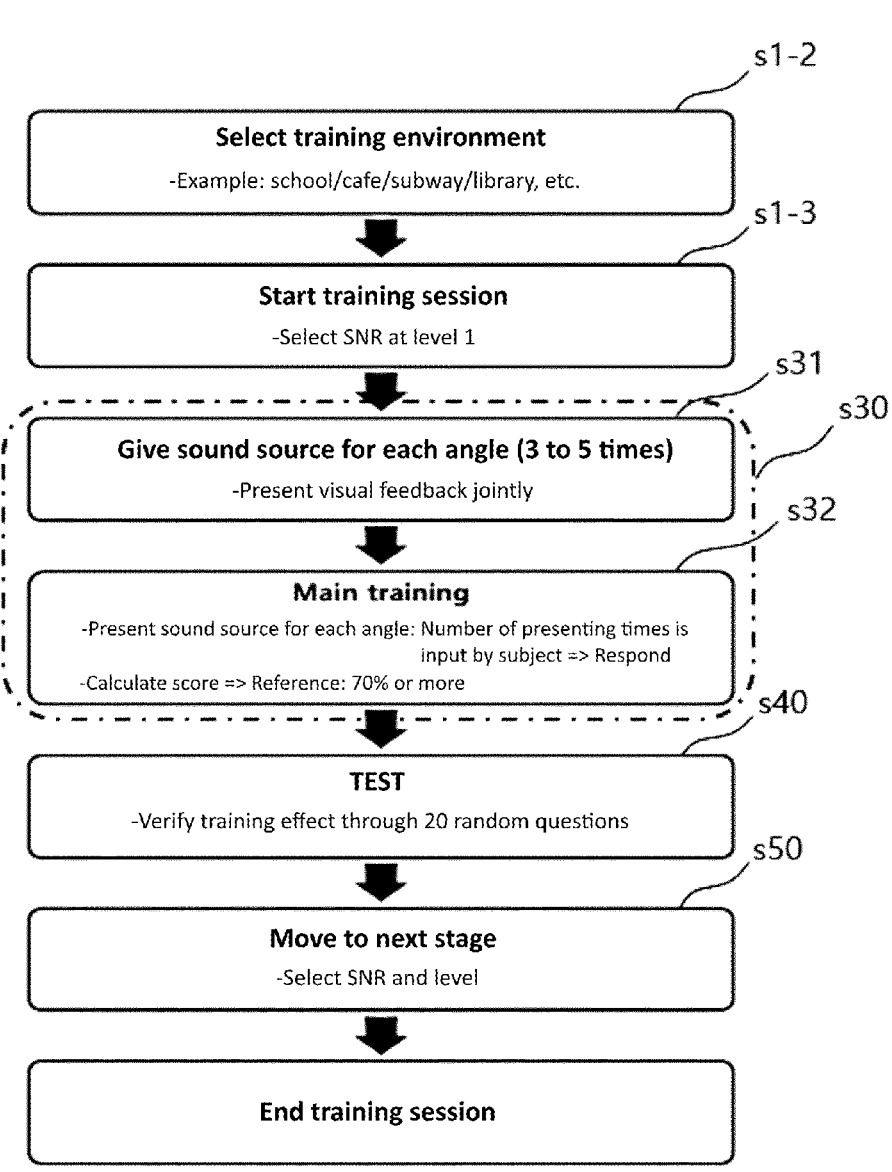
FIG. 11 is a flowchart illustrating each step of performing training by using an AR in a state in which a subject is exposed to everyday environment noise according to an exemplary embodiment of the present invention.
Figure 12:
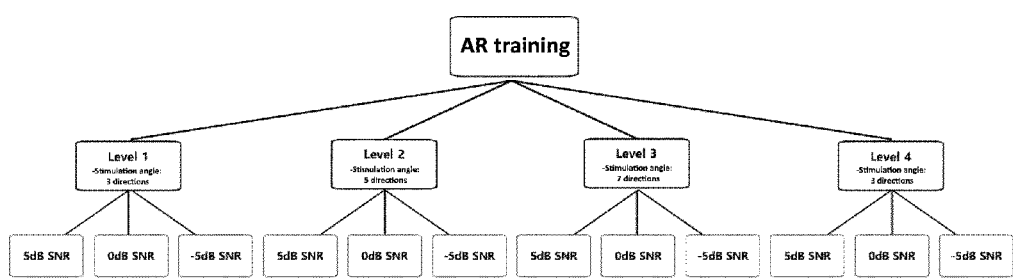
FIG. 12 is a diagram exemplarily illustrating a level-wise sound source direction angle and volume control of the sound discrimination ability training using the AR according to the exemplary embodiment of the present invention.

FIG. 11 is a flowchart illustrating each step of performing training by using an AR in a state in which a subject is exposed to everyday environment noise according to an exemplary embodiment of the present invention. FIG. 12 is a diagram exemplarily illustrating a level-wise sound source direction angle and volume control of the sound discrimination ability training using the AR according to the exemplary embodiment of the present invention.

Referring to FIGS. 11 and 12, in the level-wise training sound reproduction step s60, the training sound reproduction unit 30 may reproduce multiple training sounds having signal to noise ratios (SNR) of different sizes for each set angle of the training sound reproduced to the subject 2 exposed to ambient environmental noise at each level.

To this end, the preparation step s1 may include a microphone mounting step s1-1, a training environment selection step s1-2, and a signal-to-noise ratio (SNR) selection step s1-3.

In the training environment selection step s1-2, the subject 2 may select a training environment, for example, a specific surrounding environment among various surrounding environments such as a school, a cafe, a subway, and a library. The VR device reproduces normal noise of the surrounding environment selected by the subject 2 to the subject 2. Training using an AR device (or mobile phone application) exposes the subject 2 to various everyday environments (e.g., bus, bus stop, subway, cafe, restaurant, school, etc.) allowing sound discrimination ability training to be performed in noise given in real life.

In the signal-to-noise ratio selection step s1-3, the training sound reproduction unit 30 may receive a signal-to-noise ratio value selected from the subject 2. The subject 2 may select a specific SNR value among different SNR values such as −5 dB, 0 dB, and 5 dB.

Next, the training sound generation step s10, the training sound acquisition step s20, the training sound reproduction step s30, the determination step s40, the level control step s50, and the level-wise training sound reproduction step s60 are performed.

In detail, the training process using the AR device according to the exemplary embodiment is performed in a process similar to the training process using the VR device of the preceding embodiment (see FIG. 11), and when the subject 2 is in a daily life environment in which the subject 2 wants to proceed with the sound discrimination ability training, the subject 2 randomly hears a sound source determined for each direction, and responds to a visual target located in a direction in which the subject 2 perceives that the sound is generated. Further, the response is checked by using the AR device (or mobile phone), and whether the subject 2 has the correct response is provided as the visual stimulation.

In the case of showing the correct response and the case of showing the error response, "O, X" is shown to the visual target, and the subject 2 may be configured to autonomously check his/her own performing through the visual feedback.

The sound discrimination ability training using the AR device according to the exemplary embodiment may be performed in various stages in various environments, and the level of difficulty may be controlled by controlling the volume of the given stimulus sound and the number of directions from which the sound is heard. For example, the sound discrimination ability training may be constituted by a total of 12 stages by using a training sound direction task (setting the level to the number of angles at which a sound direction is given) constituted by three volume controls (−5 dB, 0 dB, and 5 dB SNRs by using the SNR) and four levels (see FIG. 12). Proceeding to the next level by starting from the easiest level 1 moves to the next level of training when the correct response reaches a certain target level (for example, 70%) through performance evaluation after training at the previous level.

The sound discrimination ability training using the AR ultimately aims to achieve generalization of training by performing sound discrimination ability training by the subject 2 himself in everyday life, so the subject is not constrained by the space and the time and may perform training in a time and space which the subject 2 wants. The training time and frequency may be controlled according to the change in the performance of the participants, and the result of auditory training for each session may be stored as a log file so that the subject may autonomously monitor the auditory training result.

A training effect verification test for evaluating the training effect according to the exemplary embodiments may be performed as follows.

The training effect may be evaluated by recording a response of the subject to the training sound as a log record in the database for each training session. The training effect may be evaluated by using indexes generally used for sound directional discrimination ability evaluation, such as a correct answer rate, a root mean square error (RMS error), a mean absolute error (MAE), and an error index for each training session according to the response, and a subjective enhancement level may be evaluated by using the Korean version-Speech, Spatial and Qualities of Hearing Scale (K-SSQ) questionnaire, etc.

The scope of protection in this field is not limited to the description and expression of the embodiments explicitly described above. In addition, it is added once again that the protection scope of the present invention cannot be limited due to apparent changes or substitutions in the technical field to which the present invention belongs.

EXPLANATION OF REFERENCE NUMERALS

1: Human dummy
2: Subject
3: Visual target
10: Speaker
20: Microphone
30: Training sound reproduction unit

40: Response information determination unit
50: Level control unit
60: Visual response providing unit

The invention claimed is:

1. A system for training a sound directional discrimination ability, the system comprising:
   a speaker disposed to be located within an angle range determined left and right in front of a human dummy, or disposed in front of a rotating subject and generates a sound directional training sound multiple times;
   a microphone worn on each of both ears of the human dummy or the subject, and acquiring the multiple training sounds received from the speaker, wherein the microphone acquires the training sound multiple times between the human dummy and the speaker or between one ear of the rotating subject and the speaker for each of multiple set angles;
   a training sound reproducer reproducing at least some of the acquired training sounds for the each set angle with respect to the subject;
   a response information determinator providing the subject with multiple visual targets for the each set angle, and determining whether the subject selects a correct response visual target corresponding to the set angle of the reproduced training sound among the multiple visual targets; and
   a level controller selecting at least one angle among the set angles of the training sound to be reproduced to the subject,
   wherein the level controller controls a level according to the number of times the subject selects the correct response visual target, controls the number of set angles of the training sound reproduced to the subject to increase as the level increases, and increases the level to an n+1-th level when a frequency of selecting the correct response visual target by the subject at an n-th level is equal to or greater than a predetermined probability.

2. The system for training a sound directional discrimination ability of claim 1, wherein the training sound reproducer reproduces the training sound corresponding to the angle set by the level control unit to the subject multiple times to allow the subject to check a reproduction direction of the training sound in advance.

3. The system for training a sound directional discrimination ability of claim 1, further comprising:
   a visual response provider providing a visual stimulus to the subject when the subject selects the correct response visual target.

4. The system for training a sound directional discrimination ability of claim 1, wherein the training sound reproducer reproduces multiple training sounds having signal to noise ratios of different sizes for the each set angle of the training sound reproduced to the subject exposed to a surrounding environment at the each level.

5. A method for training a sound directional discrimination ability, which is performed by a system for training the sound directional discrimination ability, which includes a speaker, a microphone, a training sound reproducer, a response information determinator, and a level controller, the method comprising:
   (a) generating, by the speaker, a sound directional training sound multiple times, wherein the speaker is disposed to be located within an angle range determined left and right in front of a human dummy, or disposed in front of a rotating subject;

(b) when the microphone is worn on each of both ears of the human dummy or the subject, acquiring, by the microphone, the multiple training sounds received from the speaker, wherein the microphone acquires the training sound multiple times between the human dummy and the speaker or between one ear of the rotating subject and the speaker for each of multiple set angles;

(c) reproducing, by the training sound reproducer, at least some of the acquired training sounds for the each set angle with respect to the subject;

(d) providing, by the response information determinator, the subject with multiple visual targets for the each set angle, and determining whether the subject selects a correct response visual target corresponding to the set angle of the reproduced training sound among the multiple visual targets;

(e) selecting, by the level controller, at least one angle among the set angles of the training sound to be reproduced to the subject;

(f) reproducing, by the training sound reproducer, at least one training sound according to the angle set by the level control unit to the subject; and (g) repeating the (d) to (f), wherein the (e) comprises controlling, by the level controller, a level according to the number of times the subject selects the correct response visual target, controlling the number of set angles of the training sound reproduced to the subject to be further increased as the level is higher, and increasing the level to an n+1-th level when a frequency of selecting the correct response visual target by the subject at an n-th level is equal to or greater than a predetermined probability.

6. The method for training a sound directional discrimination ability of claim 5, wherein the (c) comprises reproducing, by the training sound reproducer, the training sound corresponding to the angle set by the level control unit to the subject multiple times to allow the subject to check a reproduction direction of the training sound in advance.

7. The method for training a sound directional discrimination ability of claim 5, further comprising:

wherein the sound directional discrimination ability training system further includes a visual response provider, providing, by the visual response provider, the subject with a visual stimulus when the subject selects the correct response visual target, between the (d) and the (e).

8. The method for training a sound directional discrimination ability of claim 5, wherein the (f) comprises producing, by the training sound reproducer, multiple training sounds having signal to noise ratios of different sizes for the each set angle of the training sound reproduced to the subject exposed to a surrounding environment at the each level.

* * * * *